2,836,010
PALATABILITY OF VEGETABLE FOODS

Eli Seifter, Dayton, Ohio, assignor to Monsanto Chemical Company, St. Louis, Mo., a corporation of Delaware No Drawing. Application April 5, 1956
Serial No. 576,232

4 Claims. (Cl. 47—58)

This invention relates to a new and useful method of improving the palatability of various food crops, such as fruit and vegetable foodstuffs. It is a specific object of the invention to increase the sweetness of various vegetables, particularly, for animal use. It is also an object of the invention to introduce saccharin into the stems, leaves, fruit and roots of succulent tissues of growing plants.

It has been found that saccharin, also known as ortho-sulfobenzimide which has the structural formula

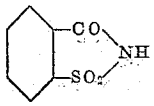

or the sodium salt of saccharin, known as sodium ortho-sulfobenzimide having the formula

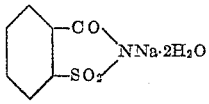

may be introduced into the tissues of living plants by applying the said saccharin or sodium saccharin to the soil in which the said plants are grown. It has also been found that the saccharin and sodium saccharin are surprisingly resistant to soil bacteria, so that the said compounds remain in the soil for a considerable period of time without decomposition or deterioration. It has also been found that the said saccharin and sodium saccharin are readily taken up by the plant without enzymatic breakdown and are then translocated into the leaves, stem, fruit and roots. In this way, the succulent tissues of the plant are increased in sweetness and become more readily palatable. It is, therefore, possible to render certain foodstuffs more attractive to animals, for example, dry and coarse forage, and, therefore, to increase the amount of food taken up by an animal. This also makes it possible to shorten the feeding period required to bring beef, sheep, hogs, and other livestock to a marketable condition. In addition, foods thus grown with internal saccharin supplementation are improved in taste, and are consequently more readily sold for human consumption, for example, in winter growing of tomatoes in hothouses.

The amount of saccharin, either in the form of the imide or of the sodium salt, which is employed in the practice of the present invention, is not critical. It has been found that quantities within the range of from 0.5 lb. to 200 lbs. per acre, calculated as the imide form of saccharin, may readily be used and result in an increased palatability of crops grown in such soils.

The following examples illustrate specific embodiments of the invention.

Example 1

In a pasture improvement test, saccharin was applied by spraying to a field of grass at the rate of 1 lb. of saccharin (in 5 gal. of water) per acre. A control plot was also employed without saccharin. Two weeks after the application of saccharin, ponies were allowed to graze at will in the treated and untreated plots. It was found that the ponies preferentially ate the grass which had taken up the saccharin.

Feed rates were also determined with hogs and beef cattle which were allowed to select a mixed feed containing saccharin or the same feed in the absence of saccharin. It was found that the animals ate more of the saccharin-containing vegetable feed, indicating a preference for the palatability of the modified product. Accelerated growth of the livestock was thus obtained.

Example 2

Growth tests in which saccharin (in aqueous solution) was applied to various fields in which vegetables were being grown, at concentrations in the range of from about 0.5 lb. per acre to 200 lbs. per acre, showed that vegetables are likewise increased in sweetness by the process of the present invention. Experiments conducted with beans, corn, and tomatoes indicate an improved palatability and sweetness of the resulting food because of the uptake of saccharin from the soil in which the plants were grown.

An advantage of the present method of introducing saccharin into feedstuff, in order to improve the palatablity thereof, is the fact that the sweeting agent is located within the succulent tissues of the vegetable feedstuff. This is an advantage over the external application of saccharin. For example, it is found that the saccharin is not as readily lost when the sweetening agent is introduced by the present method. In addition, such saccharin-supplemented feeds may be dried as, for example, is customary with various hay crops, such as bluegrass, buckwheat, alfalfa, and various kinds of beans with the retention of all the saccharin originally present in the succulent tissues.

Another advantage of the use of the above saccharin-containing feed in animal nutrition is that the animals have been found to drink more water when feeding on this supplemented feed. The increased uptake of water by the animals, such as hogs, sheep and cattle then causes the animal to have increased appetite, resulting in faster growth.

In the application of the saccharin to the soil, spraying or dusting methods may be used. In addition, fertilizers and animal protein sources, such as urea, may be applied together with the saccharin. The saccharin is taken from the soil by the plants to provide internally sweetened succulent tissues, which are advantageously used in animal feeding. A secondary advantage of this type of feed is that the sweetness is supplied in a form which does not attract insects, in contrast to the external addition of molasses or sugar.

When it is desired to introduce additional sugar or molasses in an animal feed, it has been found that the use of the present internal-saccharin-containing feedstuffs makes it possible to use far less of the sweetening materials than corresponds to the equivalent sweetness of sugar and saccharin separately. There is found to be a synergism by which the internal saccharin makes it practical to use appreciably less sugar to achieve a desired level of sweetness. In addition, the present combination is less sticky and more readily handled than the corresponding high sugar feeds.

The use of saccharin-supplemented feed as described above, for example, in corn, oats, or hay containing saccharin in the succulent tissues of the said vegetable material, is particularly advantageous in the feeding of animals such as hogs or beef. It has been found that the saccharin does not flavor the meat; in fact, control experiments indicate that the use of saccharin in the diet of an animal produces meat of exceptionally fine quality. When saccharin is fed with a high corn diet, for example, in the feeding of hogs, the result is a fine, fat animal. It is, therefore, possible by the feeding of vegetable foods, produced by the present method, to bring such animals to the market at an earlier date, which often results in the obtaining of a higher price for the animals.

What is claimed is:

1. Method of improving the palatability of crops which comprises growing the said crops in soil containing from 0.5 lb. to 200 lbs. per acre of a compound selected from the group consisting of saccharin

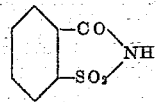

and sodium saccharin

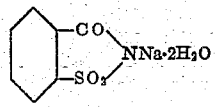

2. Method of improving the palatability of vegetables which comprises growing the said vegetables in soil containing from 0.5 lb. to 200 lbs. per acre of a compound selected from the group consisting of saccharin

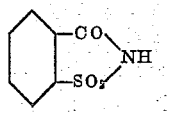

and sodium saccharin

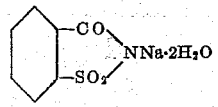

3. Method of improving the palatability of crops which comprises growing the said crops in soil containing from 0.5 lb. to 200 lbs. per acre of saccharin

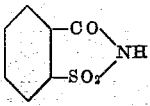

4. Method of improving the palatability of crops which comprises growing the said crops in soil containing from 0.5 lb. to 200 lbs. per acre of sodium saccharin

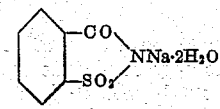

References Cited in the file of this patent

UNITED STATES PATENTS

| | | |
|---|---|---|
| 1,686,964 | Eggert | Oct. 9, 1928 |
| 1,698,539 | Eggert | Jan. 8, 1929 |
| 1,978,201 | Heuer | Oct. 23, 1934 |

OTHER REFERENCES

Chemical Abstracts, vol. 48, columns 10,237 and 10,238, published September 10, 1954, article "Analysis of the Chemical Sense of the Earthworm." (Copy in Scientific Library.)